United States Patent
Hwu

(10) Patent No.: US 10,145,861 B2
(45) Date of Patent: Dec. 4, 2018

(54) DETECTION DEVICE HAVING ATTACHED PROBE

(71) Applicant: STROMLINET NANO LIMITED, Central (HK)

(72) Inventor: En-Te Hwu, Central (HK)

(73) Assignee: STROMLINET NANO LIMITED, Central (HK)

( * ) Notice: Subject to any disclaimer, the term of this patent is extended or adjusted under 35 U.S.C. 154(b) by 48 days.

(21) Appl. No.: 15/537,120

(22) PCT Filed: Dec. 29, 2015

(86) PCT No.: PCT/CN2015/099362
§ 371 (c)(1),
(2) Date: Jun. 16, 2017

(87) PCT Pub. No.: WO2016/107534
PCT Pub. Date: Jul. 7, 2016

(65) Prior Publication Data
US 2017/0363657 A1   Dec. 21, 2017

Related U.S. Application Data

(60) Provisional application No. 62/097,467, filed on Dec. 29, 2014.

(51) Int. Cl.
| | |
|---|---|
| *G01Q 60/38* | (2010.01) |
| *G01Q 70/02* | (2010.01) |
| *G01Q 70/04* | (2010.01) |
| *B82Y 35/00* | (2011.01) |
| *G01Q 20/00* | (2010.01) |

(52) U.S. Cl.
CPC ............ *G01Q 60/38* (2013.01); *G01Q 70/02* (2013.01); *G01Q 70/04* (2013.01); *B82Y 35/00* (2013.01); *G01Q 20/00* (2013.01)

(58) Field of Classification Search
CPC ........ G01Q 20/00; G01Q 70/02; G01Q 70/04; G01Q 60/38
See application file for complete search history.

(56) References Cited

U.S. PATENT DOCUMENTS

| | | | | |
|---|---|---|---|---|
| 5,015,850 A | * | 5/1991 | Zdeblick | B82Y 35/00 369/101 |
| 5,253,515 A | * | 10/1993 | Toda | B82Y 35/00 73/105 |

(Continued)

*Primary Examiner* — Nicole Ippolito
*Assistant Examiner* — Sean Luck
(74) *Attorney, Agent, or Firm* — Chun-Ming Shih; HDLS IPR Services

(57) ABSTRACT

A detection device having an attached probe, the detection device including a base body (100) and a probe (200). The base body (100) is provided with a stage (140), the probe (200) is provided with a probe base body (210) and a tip (220) extending from a side surface of one end of the probe base body (210), another end of the probe base body (210) is adhered to the base body (100) via an adhesion piece (230), the probe base body (210) can be removed from the base body (100), and the tip (220) is close to the stage (140) and deployed in the direction thereof. The probe base body (210) is directly attached to the base body (100) and easily removed therefrom. It is therefore easy to replace the probe (200).

9 Claims, 4 Drawing Sheets

(56) References Cited

U.S. PATENT DOCUMENTS

| | | | |
|---|---|---|---|
| 2008/0257022 A1* | 10/2008 | Sachs | B82Y 35/00 73/105 |
| 2008/0309688 A1* | 12/2008 | Haaheim | G03F 7/0002 346/140.1 |
| 2010/0251439 A1* | 9/2010 | Amro | B82Y 10/00 850/40 |
| 2011/0271411 A1* | 11/2011 | Rassier | G01Q 20/02 850/6 |

* cited by examiner

DETECTION DEVICE HAVING ATTACHED PROBE

BACKGROUND OF THE INVENTION

1. Technical Field

The invention relates to detection devices, particularly to a detection device with an attached probe, whose probe is easily replaced.

2. Related Art

Atomic force microscope is a detection device for detecting tiny objects. Atomic force microscope can accurately measure an outline of a tiny object by moving a probe along a surface of the object to touch the object surface and read the tiny actions of the probe through an optical lever. The probe has a probe base body and a tip extending from a side of an end of the probe base body, and the other end of the probe base body is fixed. When the tip moves along the surface of the object, the tip can operate by flexible bending of the probe base body.

When an atomic force microscope is being used, the tip will wear away because of friction from moving along the surface of the object. When the tip has been worn away to a specific degree, the tip must be replaced to keep the measurement accuracy. Generally speaking, the probe is held by a gripper for easily replacing. When the probe base body is arranged horizontally, a gap which is the same as the tip length exists between the probe base body and the object surface. Because the gripper is greater than the probe in size, the probe base body must be arranged to meet the object surface at a considerably large angle to receive the gripper. Its drawback is that the probe base body will be over bent to break when the gripper unduly nears the object surface.

SUMMARY OF THE INVENTION

The invention provides a detection device which is easy to replace its probe.

The invention provides a detection device with an attached probe. The device includes a base and a probe. The base has a stage. The probe has a probe base body and a tip extending from a side of an end of the probe base body. Another end of the probe base body is affixed on the base by an adhesion piece. The probe base body can be removed from the base body. The tip is adjacent to and toward the stage.

Preferably, two sides of the adhesion piece are separately coated with an adhesive, and the two sides of the adhesion piece are separately adhered on the probe base body and the extended arm. Adhesion of the adhesive is between 5 g/25 mm-50 g/25 mm. The adhesive may be pressure-sensitive adhesives. The adhesive may be silicone adhesives.

Preferably, the base includes an extended arm which is adhered by the probe base body. The extended arm extends toward the stage for adhering to the probe base body. The base includes a lower portion and an upper portion supported by the lower portion. The stage is supported by the lower portion and the probe base body is arranged on the upper portion. An end of the extended arm is fixed on the upper portion, and the other end thereof extends toward the stage for adhering to the probe base body. The probe base body is arranged to be parallel with the stage.

The detection device with an attached probe of the invention, whose probe base body is directly attached on the base and the probe base body is easy to be removed, so as to easily replace the probe.

DETAILED DESCRIPTION OF THE INVENTION

Figure 1:
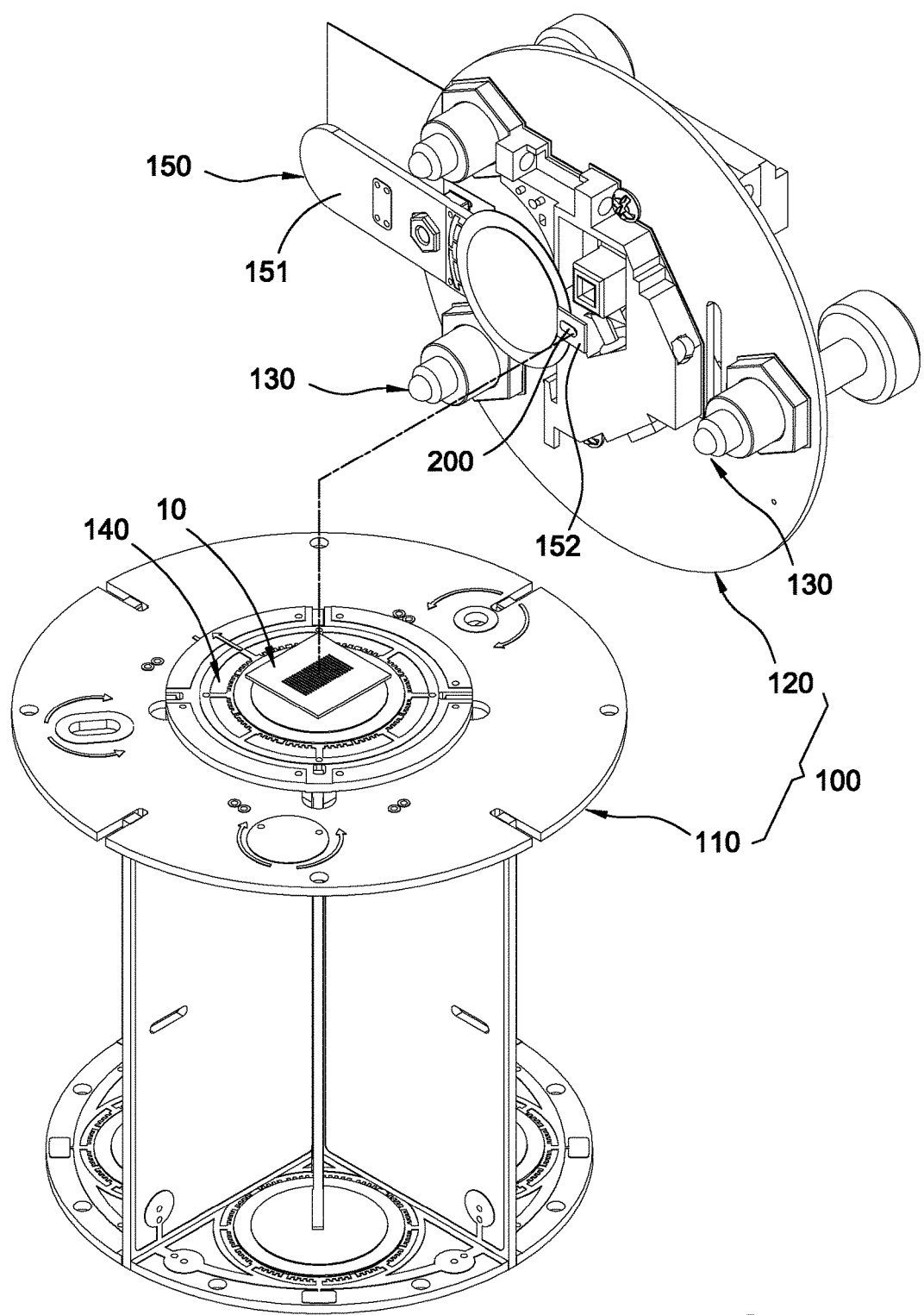
FIG. 1 is a schematic view of the detection device with an attached probe of a preferred embodiment of the invention.
Figure 2:
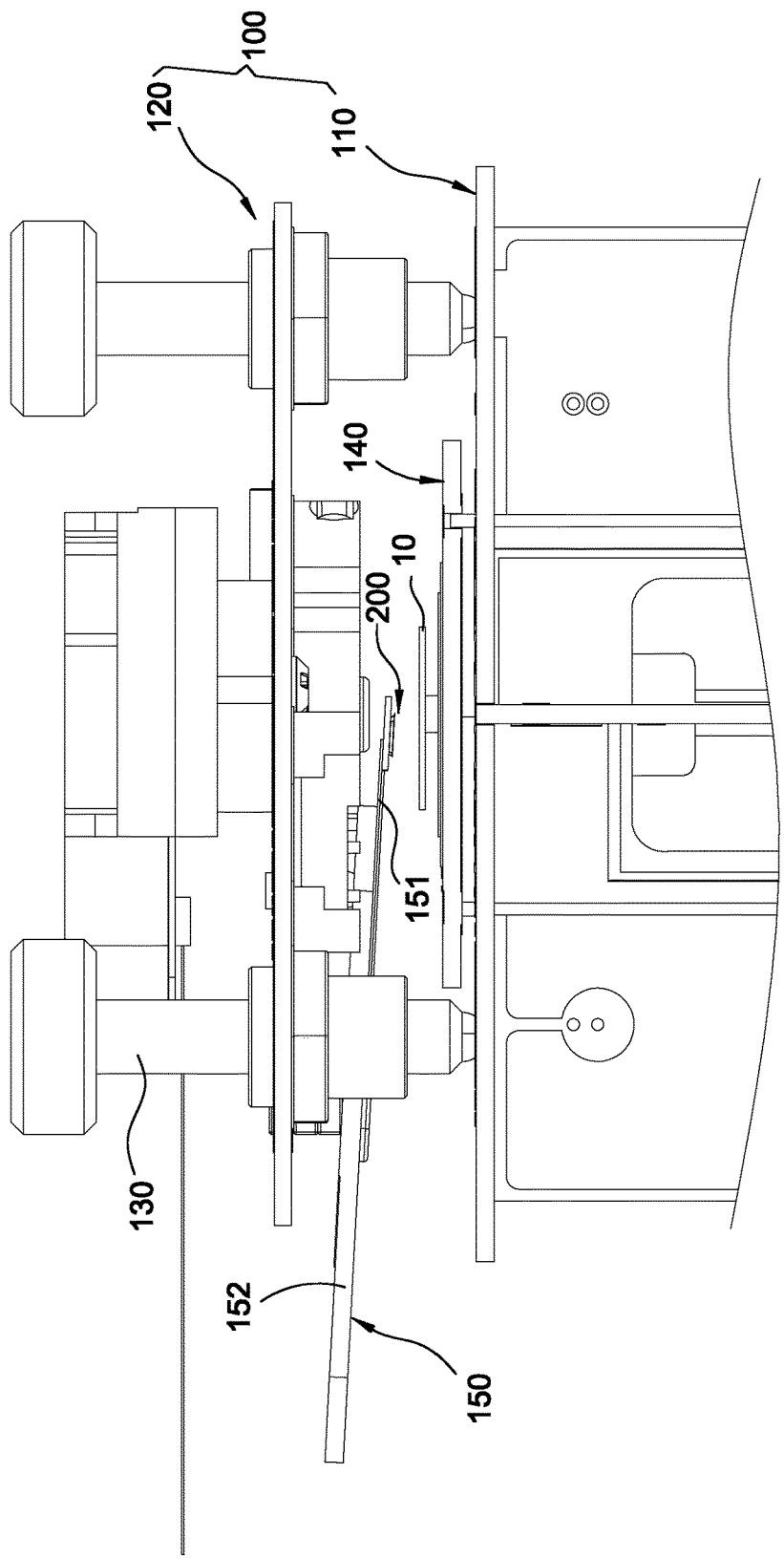
FIG. 2 is a schematic view of the detection device with an attached probe of a preferred embodiment of the invention.

Please refer to FIGS. 1 and 2. A preferred embodiment of the invention provides a detection device with an attached probe, which is applied to detect an object to be detected 10. In this embodiment, the detection device with an attached probe of the invention preferably includes a base body 100 and a probe 200.

In this embodiment, the base body 100 preferably consists of a plurality of circuit boards mortising each other. The base body 100 includes a lower portion 110 and an upper portion 120. The upper portion 120 is loaded by the lower portion 110 through support of plurality of legs 130. Each of the legs 130 is preferably screwed to the upper portion 120 and the upper portion 120 leveled by rotating the legs 130.

A stage is 140 loaded on the lower portion 110 of the base body 100. The stage 140 is between the lower portion 110 and the upper portion 120. The stage 140 is horizontally arranged to load the object to be detected 10.

The extended arm 150 is arranged on the upper portion 120 of the base body 100 and between the lower portion 110 and the upper portion 120. The extended arm 150 may be, but not limited to, formed by a circuit board. Preferably, an end of the extended arm 150 is a fixed end 151, and the other end thereof is an extended end 152. The fixed end 151 of the extended arm 150 is fastened to the upper portion 120 of the base body 100. The extended arm 150 may be arranged to be parallel to the stage 140 or slightly downward incline to the stage 140. The extended end 152 of the extended arm 150 extends toward the stage 140.

Figure 3:
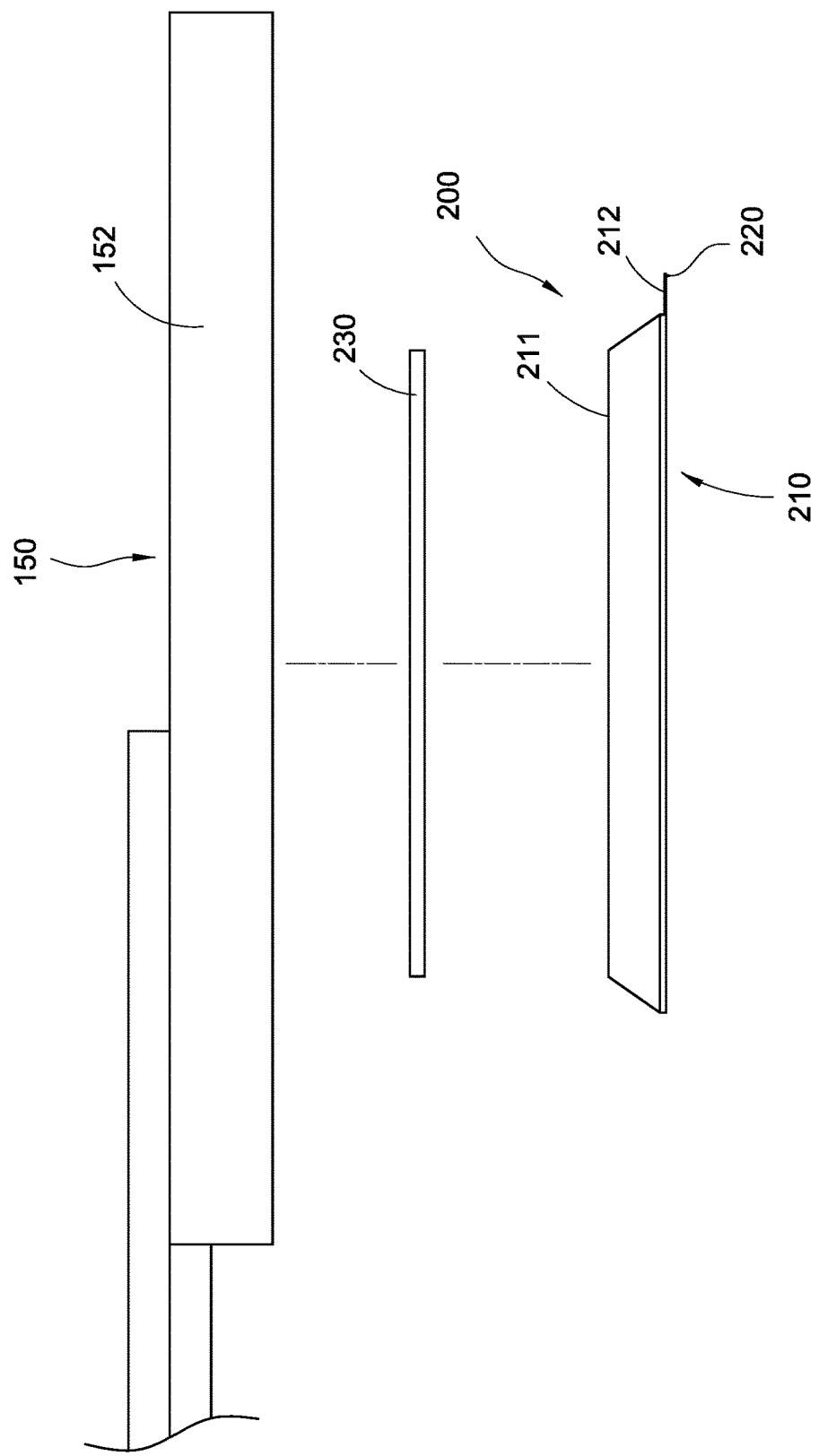
FIG. 3 is a schematic view of the probe of the detection device with an attached probe of a preferred embodiment of the invention.
Figure 4:
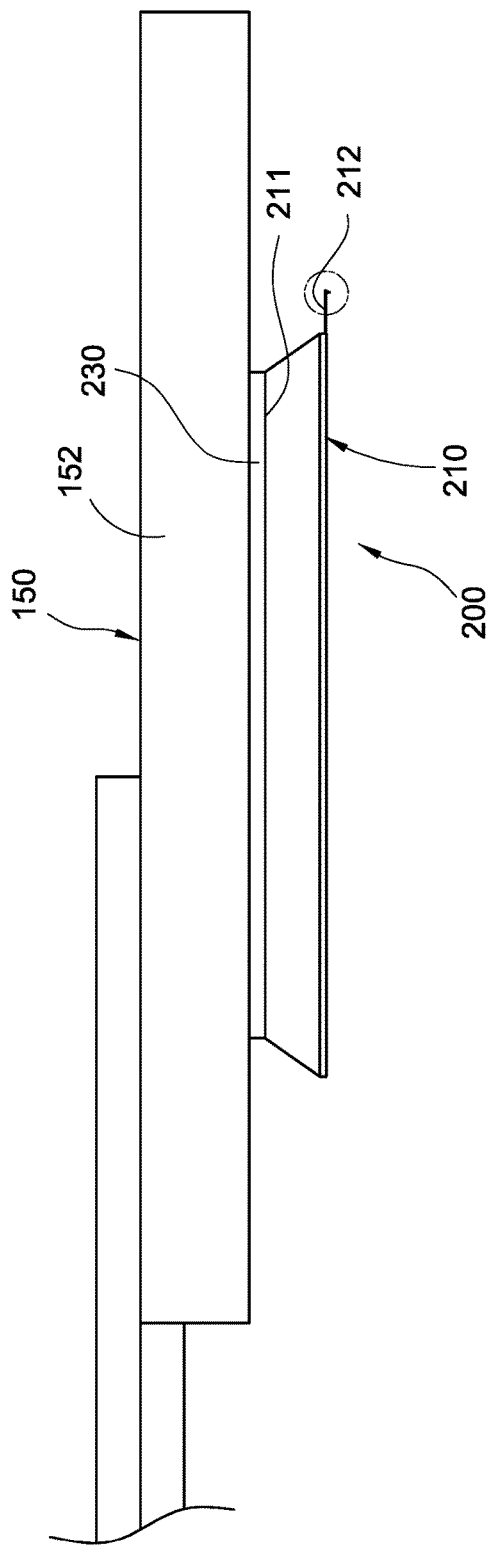
FIG. 4 is a schematic view of the probe of the detection device with an attached probe of a preferred embodiment of the invention.
Figure 5:
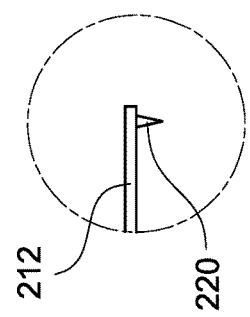
FIG. 5 is a schematic view of the probe tip of the detection device with an attached probe of a preferred embodiment of the invention.

Please refer to FIGS. 3-5. The probe 200 has a probe base body 210. An end of the probe base body 210 is an adhering end 211, and the other end thereof is a cantilever 212. A side of the cantilever 212 of the probe base body 210 is extended with a tip 220. The extended arm 150 may be arranged to be parallel to the stage 140 or slightly downward incline to the stage 140. The adhering end 211 of the probe base body 210 is adhered to the extended end 152 of the extended arm 150. The tip 220 is adjacent to the stage 140 and is arranged to be toward the stage 140. As a result, the tip 220 of the probe 200 can reach the object to be detected 10, and the cantilever 212 can be bent in its elasticity limit. The probe 200 on the cantilever 212 is allowed to follow the surface structure of the object to be detected 10 to move up and down by the stage 140 scanning the displacement.

Two sides of the adhesion piece 230 are separately coated with an adhesive with weak adhesion, and the two sides of the adhesion piece 230 are separately adhered on the probe base body 210 and the extended arm 150, so that the probe 200 is fixed on the extended arm 150. Adhesion of the adhesive with weak adhesion, such as a pressure-sensitive adhesive or silicone adhesive, is between 5 g/25 mm-50 g/25 mm, so that the probe base body 210 is easy to be removed from the extended arm 150 and the probe 200 is also easy to be replaced.

The detection device with an attached probe of the invention, whose probe base body 210 is directly attached on the extended arm 150 so that no space for receiving a gripper needs to be reserved between the probe base body 210 and the stage 140. Also, the probe base body 210 may be arranged to be adjacent to the stage 140 and to be parallel to the stage 140. Even if the extended arm 150 unduly nears the stage 140 when installing the probe 200 or measuring, the cantilever 212 will not be broken due to over bending.

It will be appreciated by persons skilled in the art that the above embodiment has been described by way of example only and not in any limitative sense, and that various alterations and modifications are possible without departure from the scope of the invention as defined by the appended claims.

What is claimed is:

1. A detection device with an attached probe, comprising: a base body (100) having a stage (140); and a probe (200), having a probe base body (210) and a tip (220) extending from a side of a cantilever (212) at an end of the probe base body (210), another end of the probe base body (210) being affixed on the base body (100) by an adhesion piece (230), the probe base body (210) being able to be removed from the base body (100), the tip (220) being adjacent to and toward the stage (140); wherein two sides of the adhesion piece (230) are separately coated with an adhesive, and the two sides of the adhesion piece (230) are separately adhered on the probe base body (210) and the extended arm (150).

2. The detection device with an attached probe of claim 1, wherein adhesion of the adhesive is between 5 g/25 mm-50 g/25 mm.

3. The detection device with an attached probe of claim 1, wherein the adhesive is a pressure-sensitive adhesive.

4. The detection device with an attached probe of claim 1, wherein the adhesive is a silicone adhesive.

5. The detection device with an attached probe of claim 1, wherein the base (150) comprises an extended arm (150), and the probe base body (210) is adhered to the extended arm (150).

6. The detection device with an attached probe of claim 5, wherein the extended arm (150) extends toward the stage (140) for adhering to the probe base body (210).

7. The detection device with an attached probe of claim 1, wherein the base body (100) comprises a lower portion (110) and an upper portion (120) loaded on the lower portion (110), the stage (140) is loaded on the lower portion (110), and the probe base body (210) is arranged on the upper portion (120).

8. The detection device with an attached probe of claim 7, wherein the base (150) comprises an extended arm (150), an end of the extended arm (150) is fastened to the upper portion (120), and another end of the extended arm (150) extends toward the stage (140) for adhering to the probe base body (210).

9. The detection device with an attached probe of claim 1, wherein the probe base body (210) and the stage (140) are arranged parallelly.

* * * * *